(12) United States Patent
Huang et al.

(10) Patent No.: US 10,882,579 B2
(45) Date of Patent: Jan. 5, 2021

(54) BICYCLE HEAD STRUCTURE AND BICYCLE

(71) Applicant: GIANT MANUFACTURING CO., LTD., Taichung (TW)

(72) Inventors: Bo-Hao Huang, Taichung (TW); Hua-Chun Huang, Taoyuan (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 142 days.

(21) Appl. No.: 15/921,639

(22) Filed: Mar. 14, 2018

(65) Prior Publication Data

US 2019/0233043 A1 Aug. 1, 2019

(30) Foreign Application Priority Data

Jan. 26, 2018 (TW) .............................. 107102992 A

(51) Int. Cl.
| | |
|---|---|
| *B62K 21/18* | (2006.01) |
| *B62J 99/00* | (2020.01) |
| *B62K 21/12* | (2006.01) |
| *B62J 11/13* | (2020.01) |

(52) U.S. Cl.
CPC .............. *B62K 21/18* (2013.01); *B62J 99/00* (2013.01); *B62K 21/12* (2013.01); *B62J 11/13* (2020.02)

(58) Field of Classification Search
CPC ...... B62K 21/18; B62K 21/12; B62J 99/0046; B62J 99/00
See application file for complete search history.

(56) References Cited

U.S. PATENT DOCUMENTS

| | | | |
|---|---|---|---|
| 4,435,983 A | 3/1984 | Shimano | |
| 6,019,017 A | 2/2000 | Lin | |
| 7,837,212 B2* | 11/2010 | D'Aluisio | ................ B60T 7/10 |
| | | | 280/281.1 |
| 9,056,646 B1* | 6/2015 | D'Aluisio | ............. B62K 19/30 |
| 2005/0280244 A1 | 12/2005 | Watarai | |
| 2017/0036735 A1* | 2/2017 | Douglas | ................... B62M 6/55 |
| 2018/0273132 A1* | 9/2018 | Huang | .................. B62K 21/12 |

FOREIGN PATENT DOCUMENTS

| | | |
|---|---|---|
| TW | M311645 U | 5/2007 |
| TW | 201020167 A | 6/2010 |
| TW | M540801 U | 5/2017 |
| TW | M548659 U | 9/2017 |

* cited by examiner

*Primary Examiner* — Ruth Ilan
*Assistant Examiner* — Harold Eric Pahlck, III
(74) *Attorney, Agent, or Firm* — CKC & Partners Co., LLC

(57) ABSTRACT

A bicycle head structure includes a stem and a detachable cover. The stem is disposed between a handlebar and a head tube of a bicycle, and the stem has a top surface. The detachable cover covers the top surface, and an accommodating space is formed between the top surface and the detachable cover.

16 Claims, 3 Drawing Sheets

BICYCLE HEAD STRUCTURE AND BICYCLE

RELATED APPLICATIONS

This application claims priority to Taiwan Application Serial Number 107102992, filed Jan. 26, 2018, which is herein incorporated by reference.

BACKGROUND

Technical Field

The present disclosure relates to a bicycle head structure. More particularly, the present disclosure relates to a bicycle head structure with a detachable cover.

Description of Related Art

In the conventional technology, cable routings of a bicycle head can be broadly divided into two types: an exposed cable routing and a hidden cable routing. In the exposed cable routing, a cable (such as a brake cable) is less likely to be pulled when a bicycle is turned, and an adjusting operation of a length of the bicycle head can be more convenient and efficient. However, the overall appearance of the bicycle head with the exposed cable routing is less attractive because of the exposed cables.

In the hidden cable routing, the cables are hidden in the bicycle head and not exposed, so that the overall appearance of the bicycle head is more integrated and beautiful. As the bicycle is turned, the cables need to be deformed as well, for example, when it is turned to the left, the left cables will become more tortuous and the right cables will become straighter. However, the cables of the hidden cable routing are limited in a narrow space, and the cables cannot be deformed easily during the bicycle is turned, thus the control of the bicycle will be affected. Further, when the cable is a brake hose which filling mineral oil with higher hardness, the bicycle will be very difficult to turn because the brake hose is not easy to be deformed. If the bicycle is turned by force, the brake hose may be bend so as to block hose internal channel for braking, and the riding safety will be affected. In addition, if the hidden cable routing needs to be rearranged, it would be more difficult and lesser efficient due to the time-consuming and labor-intensive operating process.

SUMMARY

According to one aspect of the present disclosure, a bicycle head structure is provided. The bicycle head structure includes a stem and a detachable cover. The stem is disposed between a handlebar and a head tube of a bicycle, and the stem has a top surface. The detachable cover covers the top surface, and an accommodating space is formed between the top surface and the detachable cover.

According to another aspect of the present disclosure, a bicycle includes the bicycle head structure according to the aforementioned aspect and a body structure. The body structure is connected to the bicycle head structure.

According to still another aspect of the present disclosure, a bicycle head structure is provided. The bicycle head structure includes a stem and a detachable cover. The stem is disposed between a handlebar and a head tube of a bicycle, and the stem has a top surface. The detachable cover covers the top surface, and an accommodating space is formed between the top surface and the detachable cover. The detachable cover includes a side surface and a flip side lid, and the flip side lid is disposed on the side surface and pivotally connected with the side surface. When the handlebar is rotated in a direction toward the side surface, the flip side lid is correspondingly opened, and when the handlebar is turned back, the flip side lid is closed.

According to yet another aspect of the present disclosure, a bicycle includes the bicycle head structure according to the aforementioned aspect and a body structure. The body structure is connected to the bicycle head structure.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
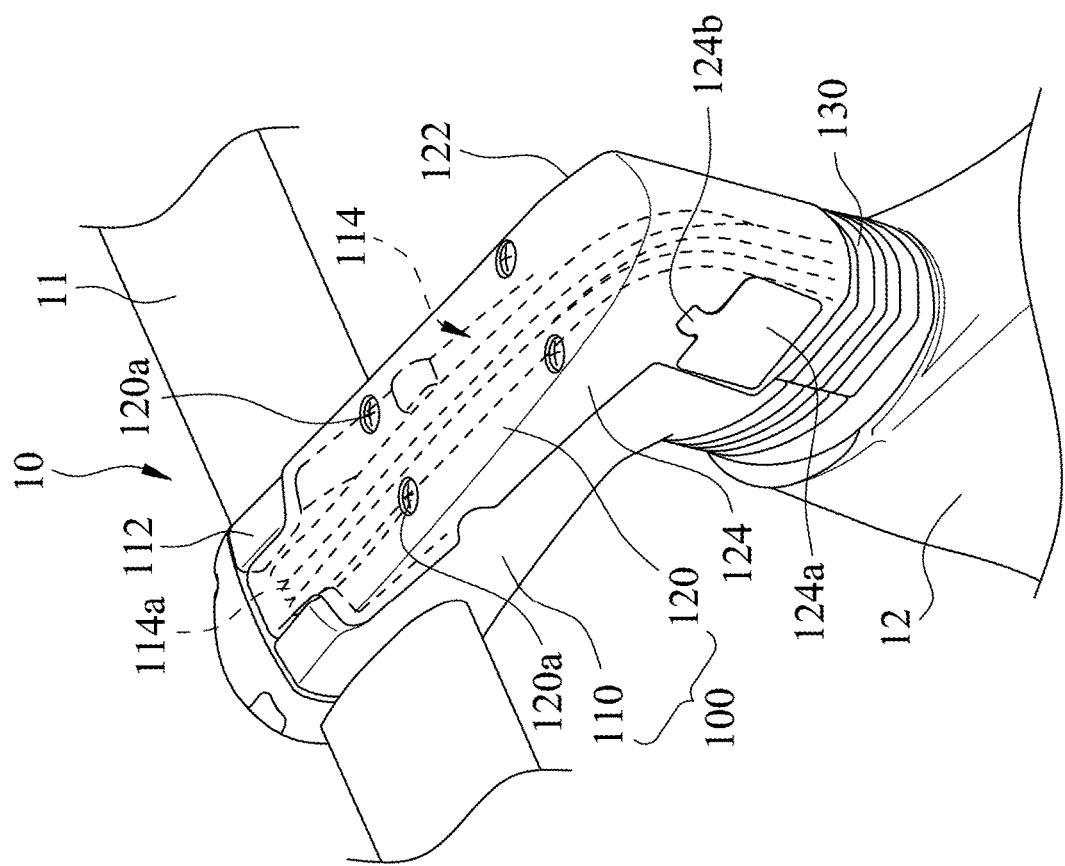
FIG. 1 is a schematic diagram of a bicycle head structure according to one embodiment of this disclosure.

Reference will now be made in detail to the present embodiments of the present disclosure, examples of which are illustrated in the accompanying drawings. Wherever possible, the same reference numbers are used in the drawings and the description to refer to the same or like parts.

Figure 2:
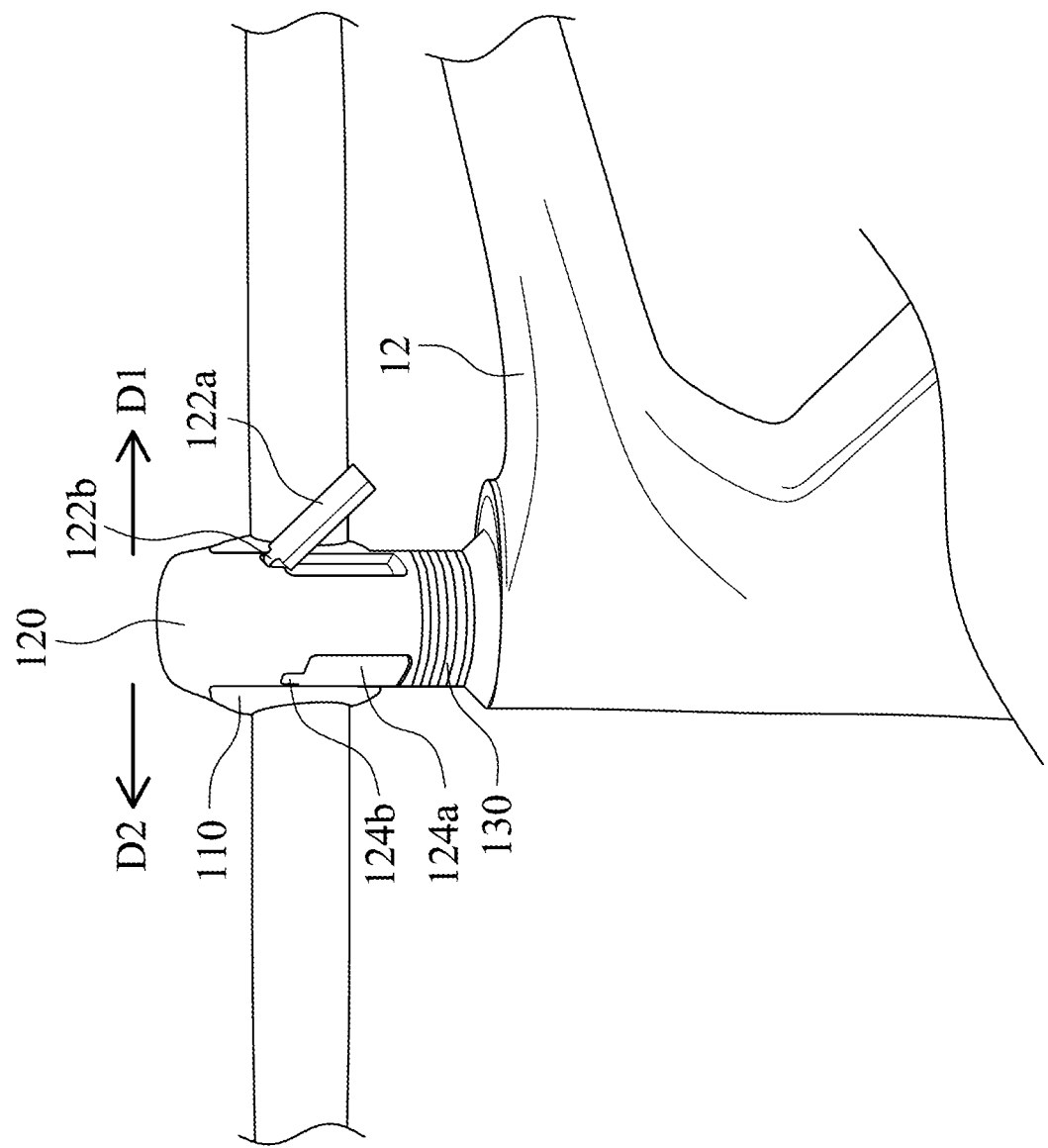
FIG. 2 is another schematic diagram of the bicycle head structure.

FIG. 1 is a schematic diagram of a bicycle head structure 100 according to one embodiment of this disclosure. FIG. 2 is another schematic diagram of the bicycle head structure 100. In FIGS. 1 and 2, the bicycle head structure 100 includes a stem 110 and a detachable cover 120. The stem 110 is disposed between a handlebar 11 and a head tube 12 of a bicycle 10, and the stem 110 has a top surface 112. The detachable cover 120 covers the top surface 112, and an accommodating space 114 is formed between the top surface 112 and the detachable cover 120. Therefore, an appearance of the bicycle head structure 100 is more aesthetically pleasing, and it is more convenient to repair without disassembling the bicycle head structure 100.

In FIG. 1, the accommodating space 114 can accommodate a plurality of cables or hoses 114a (such as brake cables, brake hoses). When the cables 114a need to be replaced, only the detachable cover 120 needs to be lifted up for replacing the cables 114a. Therefore, a replacement of the cables 114a is more convenient without disassembling the bicycle head structure 100. In addition, the accommodating space 114 can be L-shaped, thereby the cables could be get into the frame through the flexible spacer 130 without exposed. So, an overall appearance of the bicycle head structure 100 can be more integrated and beautiful.

One end of the detachable cover 120 can be pivotally connected with one end of the stem 110 closer to the handlebar 11, and the other end of the detachable cover 120 can be abutted against one end of the stem 110 closer to the head tube 12. Therefore, the repair and maintenance of the bicycle head structure 100 can be facilitated.

The detachable cover 120 can include at least one side surface and at least one flip side lid, wherein the flip side lid is disposed on the side surface, and one end of the flip side lid further includes a pivoting portion pivotally connected with the side surface. When the handlebar 11 is rotated in a direction toward the side surface, the flip side lid is correspondingly opened, and when the handlebar 11 is turned back, the flip side lid is closed. Specifically, in the embodiment of FIGS. 1 and 2, the end of the detachable cover 120 abutted against the end of the stem 110 closer to the head tube 12 can include a first side surface 122 and a second side surface 124, and the first side surface 122 is opposite to the second side surface 124. The detachable cover 120 can further include a first flip side lid 122a and a second flip side lid 124a. The first flip side lid 122a is disposed on the first side surface 122, and the second flip side lid 124a is disposed on the second side surface 124. One end of the first flip side lid 122a can further include a first pivoting portion 122b pivotally connected with the first side surface 122, and one end of the second flip side lid 124a can further include a second pivoting portion 124b pivotally connected with the second side surface 124. When the handlebar 11 is rotated in a first direction D1 (for example, on the right) toward the first side surface 122, the first flip side lid 122a is correspondingly opened, and when the handlebar 11 is turned back, the first flip side lid 122a is closed (that is, it returns to a state shown in FIG. 1). When the handlebar 11 is rotated in a second direction D2 toward the second side surface 124, the second flip side lid 124a is correspondingly opened (not shown), and when the handlebar 11 is turned back, the second flip side lid 124a is closed (that is, it returns to the state shown in FIG. 1). In this way, the cables 114a in the accommodating space 114 can be prevented from being pulled to affect the control of the bicycle 10 when the bicycle 10 is turned. The first flip side lid 122a and the second flip side lid 124a can be openable leftward, rightward, upward and downward. Preferably, the first flip side lid 122a and the second flip side lid 124a can be upward in the embodiment of FIG. 2. A direction in which the first flip side lid 122a is lifted is different from a direction in which the bicycle 10 is turned, and a direction in which the second flip side lid 124a is lifted is different from the direction in which the bicycle 10 is turned.

The detachable cover 120 can be made of a transparent material. The detachable cover 120 can be connected to the stem 110 via a plurality of bolts 120a. Thus, a state of the cables 114a in the accommodating space 114 can be observed easily. For example, when the bicycle is assembled that would be easy to decide the cable length.

In FIG. 2, the bicycle head structure 100 can further include a flexible spacer 130, which is disposed between the stem 110 and the head tube 12. In one example, the flexible spacer 130 can be made of a thermoplastic rubber (TPR). As a result, the bicycle 10 can be turned further smoothly.

Figure 3:
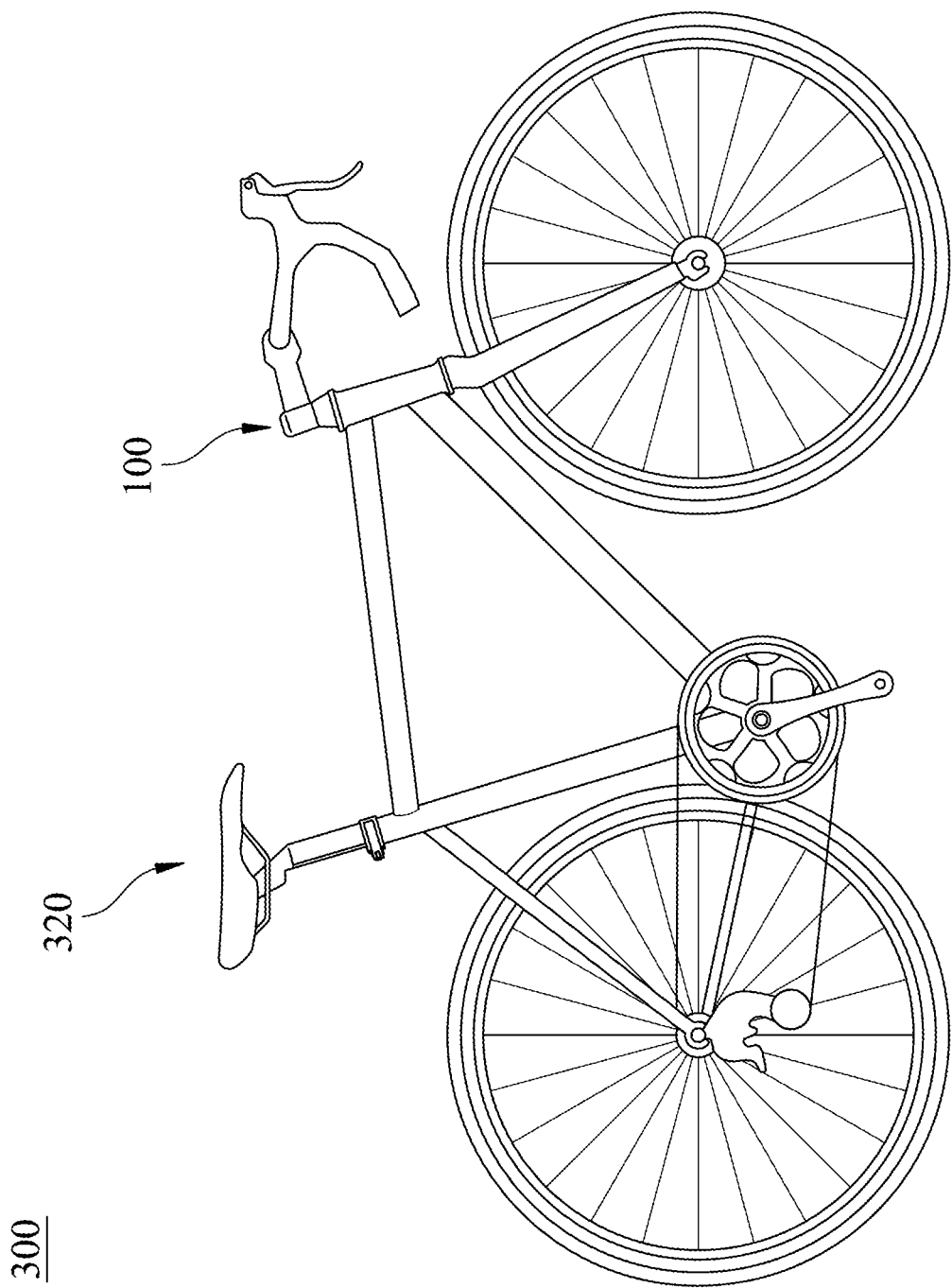
FIG. 3 is a schematic diagram of a bicycle according to another embodiment of this disclosure.

FIG. 3 is a schematic diagram of a bicycle 300 according to another embodiment of this disclosure. In FIG. 3, the bicycle 300 includes the bicycle head structure 100 and a body structure 320. The body structure 320 is connected to the bicycle head structure 100. The body structure 320 can include conventional components such as a frame structure, a steering structure, a drive system, a brake system, a wheel set, a derailleur and a shock absorber. The frame structure can include the head tube, an up tube, a down tube, a seat tube, a seat post, a seat stay, a chain stay, a gear hanger and a bottom bracket. The bicycle head structure 100 can be disposed to the head tube 12 (please refer to FIGS. 1 and 2) to achieve various advantageous effects as taught in the aforementioned embodiment.

To sum up, the present disclosure provides the bicycle head structure and the bicycle which include the detachable cover and have the accommodating space. Thus, the bicycle head structure and the bicycle have advantages of the exposed cable routing and the hidden cable routing and can avoid disadvantages of the exposed cable routing and the hidden cable routing. In addition, the detachable cover can further include the flip side lid which can be opened with the turn of the bicycle, thereby avoiding the cables in the accommodating space being pulled to affect the control of the bicycle.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bicycle head structure, comprising:
   a stem disposed between a handlebar and a head tube of a bicycle, wherein the stem has a top surface; and
   a detachable cover, wherein the detachable cover covers the top surface, an accommodating space is formed between the top surface and the detachable cover, one end of the detachable cover abutted against one end of the stem closer to the head tube comprises a first side surface and a second side surface, and the first side surface is opposite to the second side surface;
   wherein the detachable cover further comprises a first flip side lid and a second flip side lid, the first flip side lid is disposed on the first side surface, and the second flip side lid is disposed on the second side surface.

2. The bicycle head structure of claim 1, wherein the accommodating space accommodates a plurality of cables.

3. The bicycle head structure of claim 1, wherein the accommodating space is L-shaped.

4. The bicycle head structure of claim 1, wherein one end of the first flip side lid further comprises a first pivoting portion pivotally connected with the first side surface, and one end of the second flip side lid further comprises a second pivoting portion pivotally connected with the second side surface.

5. The bicycle head structure of claim 1, wherein the detachable cover is made of a transparent material.

6. The bicycle head structure of claim 1, wherein the detachable cover is connected to the stem via a plurality of bolts.

7. The bicycle head structure of claim 1, wherein the first flip side lid and the second flip side lid are openable upward.

8. A bicycle, comprising:
   the bicycle head structure of claim 1; and
   a body structure connected to the bicycle head structure.

9. A bicycle head structure, comprising:
   a stem disposed between a handlebar and a head tube of a bicycle, wherein the stem has a top surface; and
   a detachable cover, wherein the detachable cover covers the top surface and an accommodating space is formed between the top surface and the detachable cover;
   wherein the detachable cover comprises a side surface and a flip side lid, the flip side lid is disposed on the side surface, and one end of the flip side lid further comprises a pivoting portion pivotally connected with the side surface.

10. The bicycle head structure of claim 9, wherein the accommodating space accommodates a plurality of cables.

11. The bicycle head structure of claim 9, wherein the accommodating space is L-shaped.

12. The bicycle head structure of claim 11, wherein one end of the detachable cover is pivotally connected with one end of the stem closer to the handlebar, and the other end of the detachable cover is abutted against one end of the stem closer to the head tube.

13. The bicycle head structure of claim 9, wherein the detachable cover is made of a transparent material.

14. The bicycle head structure of claim 9, wherein the detachable cover is connected to the stem via a plurality of bolts.

15. The bicycle head structure of claim 9, further comprising a flexible spacer disposed between the stem and the head tube.

16. A bicycle, comprising:
the bicycle head structure of claim 9; and
a body structure connected to the bicycle head structure.

\* \* \* \* \*